United States Patent [19]
Hurner

[11] Patent Number: 5,540,198
[45] Date of Patent: Jul. 30, 1996

[54] APPARATUS AND PROCESS FOR HEATING FUEL

[76] Inventor: Erwin Hurner, 920 Belsly Blvd., South, Moorhead, Minn. 56560

[21] Appl. No.: 370,675

[22] Filed: Jan. 10, 1995

[51] Int. Cl.⁶ .................................................. F02M 31/00
[52] U.S. Cl. ..................... 123/179.21; 123/549; 123/557
[58] Field of Search ..................................... 123/549, 557, 123/543, 179.21, 546; 210/803

[56] References Cited

U.S. PATENT DOCUMENTS

| | | | |
|---|---|---|---|
| 4,010,725 | 3/1977 | White | 123/179.21 |
| 4,300,491 | 11/1981 | Hara et al. | 123/179.21 |
| 4,347,826 | 9/1982 | Nomura et al. | |
| 4,411,240 | 10/1983 | Kravetz | 123/557 |
| 4,522,712 | 6/1985 | Fischer et al. | 123/549 |
| 4,553,679 | 11/1985 | Nothen et al. | 123/549 |
| 4,628,889 | 12/1986 | Ploeg | |
| 4,834,053 | 5/1989 | Ploeg et al. | |
| 4,844,793 | 7/1989 | Izutani et al. | 123/549 |
| 4,995,992 | 2/1991 | Hurner | 210/803 |
| 5,050,545 | 9/1991 | Shirata et al. | 123/179.21 |
| 5,078,115 | 1/1992 | Yamashita et al. | |
| 5,275,146 | 1/1994 | Yamashita et al. | |

*Primary Examiner*—Marguerite Macy
*Attorney, Agent, or Firm*—Hardaway Lay Firm, PA

[57] ABSTRACT

A fuel heating device and process is provided that allows for easier cold-starting of diesel engines when the outside temperature is −10° F. (minus ten) or less. A 5 Watt heating element is used so that heat dissipates to the outside environment at a rate that prevents the fuel from overheating and, possibly, exploding by keeping the temperature of the fuel less than or equal to about 100° F.

6 Claims, 1 Drawing Sheet

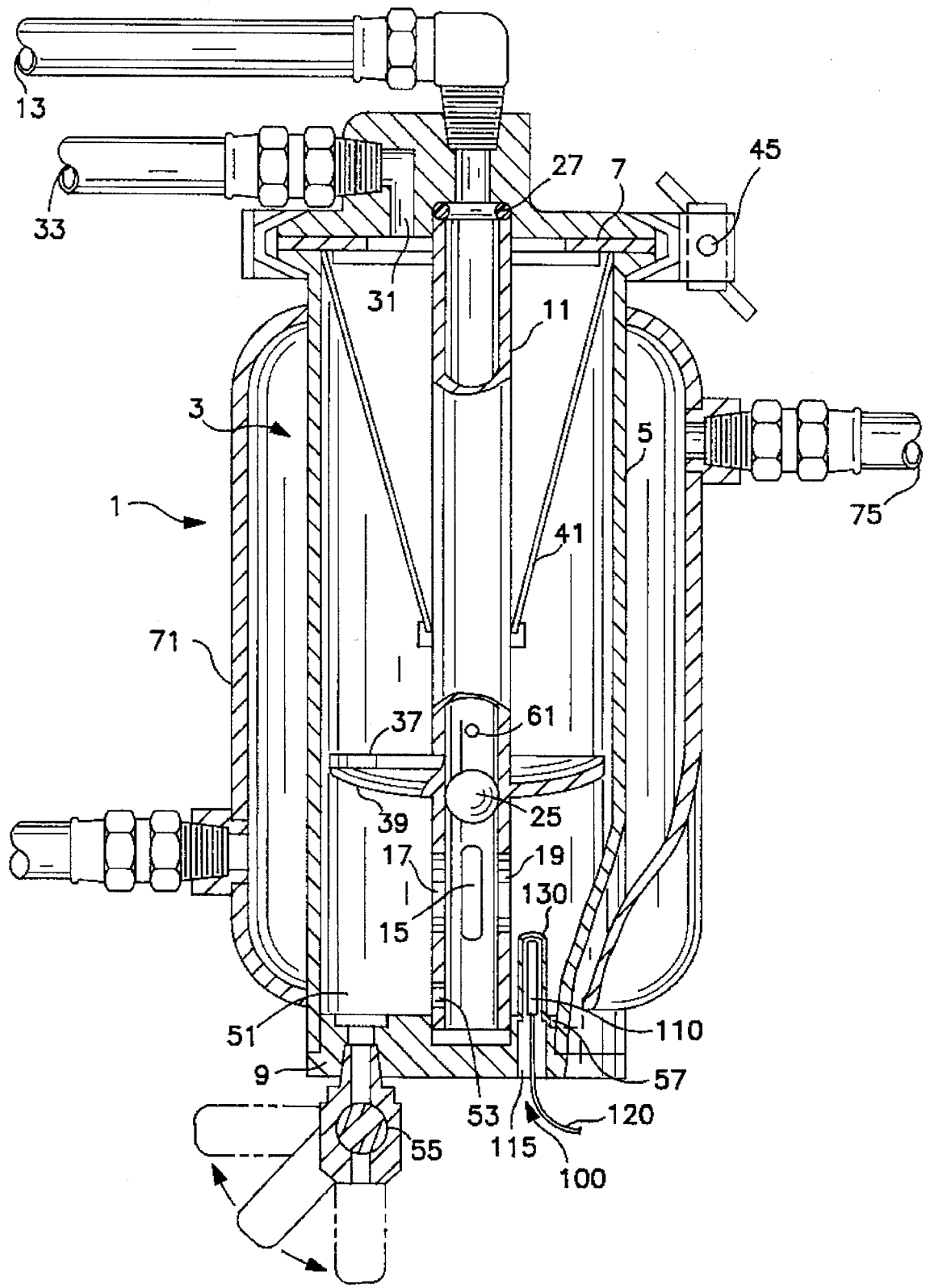

5,540,198

APPARATUS AND PROCESS FOR HEATING FUEL

BACKGROUND OF THE INVENTION

This invention relates generally to the art of fuel treatment and heating. Various devices exist within the prior art for the treatment and heating of fuels for use in internal combustion engines. For example, U.S. Pat Nos. 4,347,826, to Nomura; 4,628,889 and 4,834,053, to Van Der Ploeg; 5,078,115 and 5,275,146, to Yamashita, each disclose using a PTC (positive thermal conductivity) material to heat an air-fuel mixture in some way. Typically, they involve heating the mixture when it is in the carburetor or intake manifold and use some kind of thermostat-type switching, which if it fails can cause overheating and/or an explosive combustion of the fuel.

Diesel fuel, in particular, requires substantial treatment in order to prevent contaminants or adverse weather conditions from effecting the combustion process.

While it has been known to use of coolant from a vehicle's cooling system to heat the diesel fuel, as described in my prior U.S. Pat. No. 4,995,992, this process has not solved all the problems associated with adverse temperature conditions. In particular, such a method does not work when cold-starting a vehicle and it is commonly known that it can be extremely hard to cold-start a diesel engine without warming the fuel and the engine first. However, again, it is also known chat if too much heat is applied in the warming process, besides the fact that because fuel is a combustible material which if over-heated could cause the vehicle to possibly explode, the pressure of the heated fuel may also rise to a level that may cause fuel lines to rupture, further increasing the chance of explosion.

Thus, because these problems need to be solved, there is room for improvement within the art.

OBJECTS OF THE INVENTION

It is thus an object oil this invention to provide a novel apparatus and process for heating fuel.

It is a further object of the invention to provide a novel apparatus that heats fuel and allows for easier cold-starts of vehicles.

It is yet a further object of the invention to provide a novel apparatus that does not cause too much heat to applied to the fuel and therefore prevents the chance of overheating or any explosions.

These as well as other objects are accomplished by a fuel treating and heating apparatus for an internal combustion engine comprising: a fuel inlet; a fuel outlet; a fuel treating unit in fluid communication with the fuel inlet and the fuel outlet, the fuel treating portion having an inwardly directed cavity; a fuel heating unit protruding into the cavity of the fuel treating unit, the fuel heating unit working independent of whether the internal combustion engine is running; whereby upon activation of the fuel heating unit, any fuel within the fuel treating unit is heated to a fixed temperature.

BRIEF DESCRIPTION OF THE DRAWING

The Figure is a sectional view of a fuel treatment apparatus having a heater associated therewith in accordance with this invention.

DETAILED DESCRIPTION

It has been found in accordance with this invention that a fuel treatment apparatus having a heater associated therewith which permits fuel going to an engine through the blending head to be heated. Various other advantages and features will become apparent from a reading of the following description given with reference to the various figures of drawings.

The Figure is a sectional view of the apparatus 1 and is a sectional view of an otherwise generally cylindrical-shaped apparatus. The structures illustrated in FIG. 1 are shown in the same plane for purposes of illustration.

Fuel treatment apparatus 1 comprises the subject of this invention which is a heating unit 100 positioned below fuel treatment apparatus 1 as substantially taught and disclosed in U.S. Pat. No. 4,995,992, the disclosure which is hereby incorporated by reference. Apparatus 1 comprises means 3 defining a settling chamber which also includes a side wall 5, a top 7, and a bottom 9.

A first conduit means 11 is in communication with the source of fuel as to tank through means 13. First conduit means 11 defines a fuel inlet in the bottom of the chamber slots 15 fully illustrated and 17 and 19 only partially illustrated in the cutaway view.

It is thus seen that fuel travels through 13 down first conduit means 11 and out the fuel inlets 15, 17, 19, and 21 located in a lower portion of chamber 3. First conduit means 11 has located therein a buoyant valve means 25 which during non-operation and a full fuel condition floats up first conduit means 11 to a restriction 27 in the form of a O-ring sealing the first conduit means within the chamber. Thus, in operation the buoyant valve means 25 floats upwardly through the conduit means and prevents fuel communication back through means 13 to the fuel tank.

The flotation time between the bottom or lower portion of the chamber as illustrated in the Figure to contact restriction 27 has a lag time preferably of about 4 seconds. During this lag time, any debris within the fuel passes down conduit means such that upon contact of buoyant valve means 25 with restriction 27 no debris remains to adversely effect the seal between 25 and 27.

Buoyant valve means 25 is illustrated here in the form of a metallic hollow shell ball much in the form of a ping-pong ball so as to be buoyant within diesel fuel.

Thus, during normal operation, the fuel enters through first conduit means 11 passes through the fuel inlets 15, 17, 19, and 21 while contacting buoyant valve means 25 and forcing same into a lower position and out second conduit means 31 defined through the top of said chamber and acting as an outlet to permit fuel to pass on through means 33 for use in a combustion engine. Provided within chamber 3 for treatment of the fuel is a spreader 37 defining a drain office 39 therein and a water oil separator 41. These components are well described in U.S. Pat. No. 4,624,779, the disclosure which is hereby incorporated by reference. These components are clamped within the chamber 3 by clamping means 45 to thereby form a closed system.

During normal operation, moisture and other debris accumulate at the bottom of the chamber as at 51. Conduit means 11 has a means 53 therein to permit communication by moisture and debris to the bottom portion of 51 of the chamber 3.

Located in the bottom of chamber 3 is drain means 55. It has surprisingly been found that the location of a drain means within a recess 57 greatly enhances the ability to drain water from the system. Recess 57 is in the form of an annulus about the bottom 9 of chamber 3. In actual operation water droplets appear almost magnetically attracted to recess 57 for drainage through drain means 55.

Of course, during the draining process buoyant valve means 25 is located against restriction 27 so that upon opening the system siphoning back through means 13 to the fuel tank does not occur. Upon opening of valve means 55, moisture drains from the system and is replaced by air which is quickly displaced upon engine operation.

A significant advance is provided by first conduit means 11 defining a secondary fuel inlet 61 above the primary fuel inlets 15 through 21 which permits fuel to enter the system if accumulated water freezes closing off primary outlets 15 through 21. The secondary outlet 61 is referred to as a weep hole and permits only sufficient amount of fuel to enter the system so as to maintain idle speed.

A water jacket 71 is provided which utilizes water from the cooling system of internal combustion engine and permits the cooling fluid to enter at 73 and exit at 75 to heat chamber 3 and, more specifically, to heat any fuel flowing through the small gap between spreader 37 and wall 5. This heating process effects the frosting of any frozen fuel which may clog the primary fuel inlets by idle operation through secondary fuel inlets 61 located in an upper portion of the chamber above the primary fuel inlets.

To apply additional heat to apparatus 1, especially when cold-starting the engine, heating unit 100 is provided. Heating unit 100 comprises a heating element 110 in contact with a raised cavity 130 in, for example, bottom 9, which will be made from a heat conducting material and have a bore 115. Lead 120 extends from heating element 110 and may come from the vehicle battery or any other source of power such that the heater may operate independently of whether the internal combustion engine is running. It is anticipated that the heating unit will require between 0.51–1.0 Amps of current to operate. Lead 120 will also be connected to a switch (not-shown) such that the heater 100 may be manually switched on and off as needed.

For the particular application according to the invention, namely heating diesel fuel prior to cold-starting the vehicle, it has been found that by using a heating element that produces about 5 (five) Watts of power, the chances for any explosions or overheating are greatly reduced while allowing a diesel engine to be cold-started in outside temperatures of about −10° F. (minus ten) or less. The chances for any explosions or overheating are reduced because the low amount of power produced by the heater, at an outside temperature of about −10° F. or less, will cause any excess heat produced to dissipate to the environment at a rate that will cause the heated fuel never to exceed the safe temperature of about 100° F. (one hundred), no matter how long the heater is left on. Temperatures greater than about 100° F. may lead to problems such as overheating or explosions. In use, when the outside temperature is about −10° F. or less, the operator activates the heater and leaves it on. As described above, this may be done while the vehicle engine is not running, i.e., over-night. As described above, the fuel will be heated to a temperature of no more than about 100° F., no matter how long the heater is left on, which will allow for easier cold-starting while greatly reducing the risk of explosions or other problems. The heating element used is about 1 (one) inch high and ⅜ (three-eighths) inch wide. The difference between this arrangement and those that use PTC materials, as described above, is that the instant invention allows outside air to be used to dissipate extra heat and does not require the use of exotic PTC materials.

As many variations will become apparent to those of skill in the art from a reading of the above description which is exemplary in nature, such variations are embodied within the spirit and scope of the following appended claims.

That which is claimed:

1. A process for allowing a diesel engine to cold-start in temperatures of −10° F. (minus ten) or less, comprising the steps of:

providing a fuel treating unit with a 5 Watt heating unit;

activating said heating unit when the outside temperature reaches −10° F. or less;

leaving said heating unit on for so long as said temperature does not go above −10° F.;

whereby due to heat dissipation between said heating unit, the outside environment, and the fuel, the fuel is kept warm enough to allow the vehicle to cold-start, yet cool enough to keep the fuel system at a safe temperature, no matter how long the heating unit is left activated.

2. The process according to claim 1 wherein said step of activating further comprises activating said heating unit overnight so that said engine will cold-start in the morning.

3. The process according to claim 1, wherein said step of providing further comprises providing said fuel treating unit in fluid communication with a fuel inlet and a fuel outlet, said fuel treating portion having an inwardly directed cavity and placing said fuel heating unit into said cavity of said fuel treating unit.

4. The process according to claim 1, wherein said heating unit is a heating element.

5. The process according to claim 1, further comprising:

providing a source of power for said heating unit, said source of power available regardless of whether said engine is running.

6. The process according to claim 1 wherein said safe temperature is Less than or equal to 100° F.

\* \* \* \* \*